United States Patent
Zhao (10) Patent No.: US 12,355,559 B2
(45) Date of Patent: Jul. 8, 2025

(54) CHANNEL ENCODING METHOD AND CONTROL DEVICE

(71) Applicant: GUANGDONG OPPO MOBILE TELECOMMUNICATIONS CORP., LTD., Dongguan (CN)

(72) Inventor: Zhenshan Zhao, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 430 days.

(21) Appl. No.: 18/075,572

(22) Filed: Dec. 6, 2022

(65) Prior Publication Data

US 2023/0097206 A1    Mar. 30, 2023

Related U.S. Application Data (63) Continuation of application No. PCT/CN2020/095821, filed on Jun. 12, 2020.

(51) Int. Cl.
*H04L 1/00* (2006.01)
*H04W 72/11* (2023.01)

(52) U.S. Cl.
CPC ............ *H04L 1/001* (2013.01); *H04L 1/0061* (2013.01); *H04W 72/11* (2023.01)

(58) Field of Classification Search
CPC ..... H04L 1/001; H04L 1/0061; H04L 1/0009; H04L 1/0041; H04L 1/0057; H04L 1/0071; H04L 1/0072; H04L 1/1812; H04L 5/0053; H04W 72/11; H04W 72/232; H04W 72/042; H04W 72/23; H04W 88/02
See application file for complete search history.

(56) References Cited

U.S. PATENT DOCUMENTS

| | | |
|---|---|---|
| 2006/0233280 A1 | 10/2006 | Tynderfeldt |
| 2008/0168332 A1 | 7/2008 | Palanki |
| 2010/0120423 A1 | 5/2010 | Awad |

(Continued)

FOREIGN PATENT DOCUMENTS

| | | |
|---|---|---|
| CN | 101584143 A | 11/2009 |
| CN | 101675619 A | 3/2010 |

(Continued)

OTHER PUBLICATIONS

First Office Action of the Chinese application No. 202310162301.3, issued on Jun. 27, 2024. 13 pages with English translation.
LG Electronics. "PDCCH design principles" 3GPP TSG RAN WG1 #48bis R1-071548, Mar. 30, 2007 (Mar. 30, 2007).
International Search Report in the international application No. PCT/CN2020/095821, mailed on Mar. 10, 2021.
Written Opinion of the International Searching Authority in the international application No. PCT/CN2020/095821, mailed on Mar. 10, 2021.

(Continued)

*Primary Examiner* — Rushil P. Sampat
(74) *Attorney, Agent, or Firm* — BAYES PLLC (57) ABSTRACT

Provided are a channel encoding method and a control device. In the channel encoding method, a control device sends configuration information to a controlled device, wherein the configuration information is used for configuring one of the following: a channel encoding manner corresponding to at least one semi-persistent scheduling configuration; a channel encoding manner corresponding to a first transport block, with the number of bits of the first transport block being less than a first threshold value and greater than a second threshold value; and a channel encoding manner corresponding to a first downlink control channel.

17 Claims, 3 Drawing Sheets

(56) References Cited

U.S. PATENT DOCUMENTS

| | | |
|---|---|---|
| 2012/0089890 A1 | 4/2012 | Palanki |
| 2015/0245326 A1 | 8/2015 | Rune |
| 2017/0026976 A1 | 1/2017 | Yoo |
| 2017/0099327 A1 | 4/2017 | Negalaguli |
| 2017/0099328 A1 | 4/2017 | Patel |
| 2018/0097555 A1 | 4/2018 | Nammi |
| 2018/0198590 A1* | 7/2018 | Lee ............... H04L 1/1671 |
| 2018/0199317 A1* | 7/2018 | Hwang ........... H04L 1/0061 |
| 2019/0181937 A1 | 6/2019 | Nammi |
| 2020/0304196 A1 | 9/2020 | Nammi |

FOREIGN PATENT DOCUMENTS

| | | |
|---|---|---|
| CN | 107800508 A | 3/2018 |
| CN | 107852273 A | 3/2018 |
| CN | 109873687 A | 6/2019 |
| CN | 109983720 A | 7/2019 |
| WO | 2017014846 A1 | 1/2017 |

OTHER PUBLICATIONS

Antii Toskala et al: "LTE Radio Protocols (Chapter 6)", In: "LTE for UMTS: OFDMA and SC-FDMA Based Radio Access", Jun. 12, 2009 (Jun. 12, 2009), Wiley, XP055054236, ISBN: 978-0-47-099401-6, pp. 137-163, 27 pages.

First Office Action of the European application No. 20939676.1, issued on Feb. 22, 2024, 10 pages.

"3rd Generation Partnership Project; Technical Specification Group Radio Access Network; NR; Physical layer procedures for data (Release 16)", 3GPP TS 38.214 v16.0.0 (Dec. 2019), pp. 1-147, XP051860777, Section 5.1.2.1.1, p. 15; Section 5.1.2.2, p. 19; Section 5.1.3, p. 22; Section 5.1.3.1, p. 24; Section 6.1.2.2, p. 111; Section 6.1.2.3, p. 114; p. 115, line 1-line 18; Section 6.1.4, p. 117. 147 pages.

Supplementary European Search Report in the European application No. 20939676.1, mailed on Jun. 2, 2023. 13 pages.

* cited by examiner

CHANNEL ENCODING METHOD AND CONTROL DEVICE

CROSS-REFERENCE TO RELATED APPLICATION

The present application is a continuation application of International Patent Application No. PCT/CN2020/095821 filed on Jun. 12, 2020, which is hereby incorporated by reference in its entirety.

BACKGROUND

In cellular communication, a control channel and a data channel may use different encoding manners based on preconfiguration manners. In a target communication system of the disclosure, since there may be a high-power burst interference source on an operating frequency band of the system, the communication of the system is influenced largely by the burst interference source. That is, there is a great difference between the target communication system and the cellular communication, and how to implement channel encoding in target communication of the disclosure is an urgent problem to be solved. For convenience of descriptions, such communication system is briefly referred to as a burst interference system below.

SUMMARY

The embodiments of the disclosure provide a method for channel encoding, a control device, and a controlled device, which may implement channel encoding in a burst interference system.

According to a first aspect, there is provided a method for channel encoding, which includes the following operations. A control device sends configuration information to a controlled device, here the configuration information is used to configure one of: a channel encoding manner corresponding to at least one semi-static scheduling configuration; a channel encoding manner corresponding to a first transport block which has a number of bits less than a first threshold and greater than a second threshold; or a channel encoding manner corresponding to a first downlink control channel.

According to a second aspect, there is provided a method for channel encoding, which includes the following operation. A controlled device receives configuration information sent by a control device, here the configuration information is used to configure one of: a channel encoding manner corresponding to at least one semi-static scheduling configuration; a channel encoding manner corresponding to a first transport block which has a number of bits less than a first threshold and greater than a second threshold; or a channel encoding manner corresponding to a first downlink control channel.

According to a third aspect, there is provided a control device, comprising: a transceiver configured to send configuration information to a controlled device, wherein the configuration information is used to configure one of: a channel encoding manner corresponding to at least one semi-static scheduling configuration; a channel encoding manner corresponding to a first transport block which has a number of bits less than a first threshold and greater than a second threshold; or a channel encoding manner corresponding to a first downlink control channel.

DETAILED DESCRIPTION

The technical solutions in the embodiments of the disclosure will be described below in combination with the drawings in the embodiments of the disclosure. It is apparent that the described embodiments are a part rather than all of the embodiments of the disclosure. Based on the embodiments of the disclosure, all other embodiments obtained by those of ordinary skill in the art without paying any creative work shall fall within the scope of protection of the disclosure.

Figure 1:
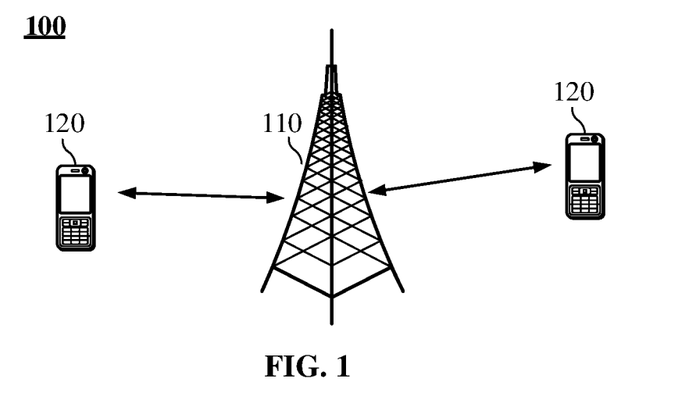
FIG. 1 is a schematic diagram of architecture of a burst interference system according to an embodiment of the disclosure.

The embodiments of the disclosure may be applied to a burst interference system. Exemplarily, the burst interference system 100 to which the embodiments of the disclosure are applied is shown in FIG. 1. The burst interference system 100 may include a control device 110 (or referred to as a control node) which may be a device in communication with a controlled device 120 (or referred to as a controlled terminal). The control device 110 may provide communication coverage for a specific geographic area and may communicate with controlled devices located within the coverage area.

FIG. 1 exemplarily shows a control device and two controlled devices. Optionally, the burst interference system 100 includes multiple control devices, and other numbers of controlled devices are included in the coverage of each control device, which is not limited in the embodiments of the disclosure.

Optionally, the burst interference system 100 further includes other network entities, which is not limited in the embodiments of the disclosure.

It is to be understood that a device having a communication function in a network/system in the embodiment of the disclosure may be referred to as a communication device. Taking the burst interference system 100 shown in FIG. 1 as an example, the communication device may include a control device 110 and a controlled device 120 of which each having a communication function. Each of the control device 110 and the controlled device 120 may be a specific device as described above, and will not be elaborated here. The communication device may further include other devices in the burst interference system 100, which is not limited in the embodiments of the disclosure.

It is to be understood that terms "system" and "network" in the disclosure may usually be used interchangeably. In the disclosure, term "and/or" refers to only an association relationship for describing associated objects and represents that three relationships may exist. For example, A and/or B may represent three conditions: i.e., only A, both A and B, and only B. In addition, character "/" in the disclosure usually represents that previous and next associated objects form an "or" relationship.

It is to be understood that "indication" mentioned in the embodiments of the disclosure may be a direct indication, or may be an indirect indication, or may be represented as having an association relationship. For example, A indicates B, which may indicate that A directly indicates B, for example, B may be obtained by A; or may indicate that A indirectly indicates B, for example, A indicates C, and B may be obtained by C; or may indicate that A and B have an association relationship there-between.

Optionally, indication information in the embodiments of the disclosure includes at least one of physical layer signaling (such as Downlink Control Information (DCI)), Radio Resource Control (RRC) signaling, or Media Access Control Control Element (MAC CE).

In descriptions of the embodiments of the disclosure, term "corresponding" may indicate that there are direct or indirect correspondences between two items, or may indicate that the two items have an association relationship there-between, or may have an indicating and indicated relationship, a configuring and configured relationship, or the like.

The controlled device in the embodiments of the disclosure may be a mobile phone, a tablet computer (Pad), a computer with a wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, a wireless terminal device in a smart home, or the like.

By way of example rather than limitation, in the embodiments of the disclosure, the controlled device may also be a wearable device. The wearable device may also be referred to as a wearable smart device, which is a generic term of a wearable device developed by applying a wearable technology to make an intelligent design for a daily wearable device, such as glass, glove, watch, clothing, shoe, or the like. The wearable device is a portable device which is either directly worn on the body or integrated into the user's clothing or accessory. The wearable device is not only a hardware device, but also implements powerful functions through software support, data interaction and cloud interaction. A generalized wearable smart device includes full functions and a large size, and may not rely on a smart phone to implement complete or partial functions, such as a smart watch or smart glass, or may only focus on a certain type of application function, and need to be used in combination with other devices (such as smart phones), such as various smart bracelets, smart jewelry, or the like which perform physical sign monitoring.

In a burst interference system, similar to a current cellular network communication system, a control device has functions similar to those of a base station in a cellular network, and is responsible for functions of sending a synchronization signal, sending broadcast information, access control, data transmission and reception, sending high-level information, or the like; and the controlled device is responsible for functions of detecting a synchronization signal, receiving a broadcast message, receiving and sending data according to scheduling of the control device, receiving high-level information, or the like.

In the embodiments of the disclosure, for convenience of descriptions, sending from the control device to the controlled device is referred to as downlink, and sending from the controlled device to the control device is referred to as uplink.

In a conventional cellular communication system, a control channel and a data channel may use different encoding manners based on preconfigured information. For example, in a New Radio (NR) system, when a number of information bits sent by the control channel is less than 11, packet encoding is used. Otherwise, the control channel uses polar encoding, and the data channel uses Low Density Parity-Check Code (LDPC) encoding. The receiving end may perform reception and decoding according to a channel type and a number of bits (known to the receiving end) sent by the channel.

In the burst interference system related to the disclosure, there is a requirement that different encoding manners are used according to interference conditions due to existence of some burst interference sources, and such manner of encoding selection is not supported in the conventional cellular communication system. Furthermore, the conventional cellular communication system does not support selection of different encoding manners according to different channel environments, and the channel environment described here may be a real channel interference environment or a predicted interference environment which may occur.

It may be seen from the above analysis that in the solutions provided in the disclosure, for a specific semi-static scheduling configuration, a transport block within a specific size range, or a specific channel, a controlled node may select an encoding manner dynamically or semi-statically according to one or more of information such as a current time, a geographic position, a channel interference condition, or the like, so that anti-interference capability of the system may be improved by adjusting an encoding manner.

The technical solutions of the disclosure will be described in detail below by way of specific embodiments.

Figure 2:
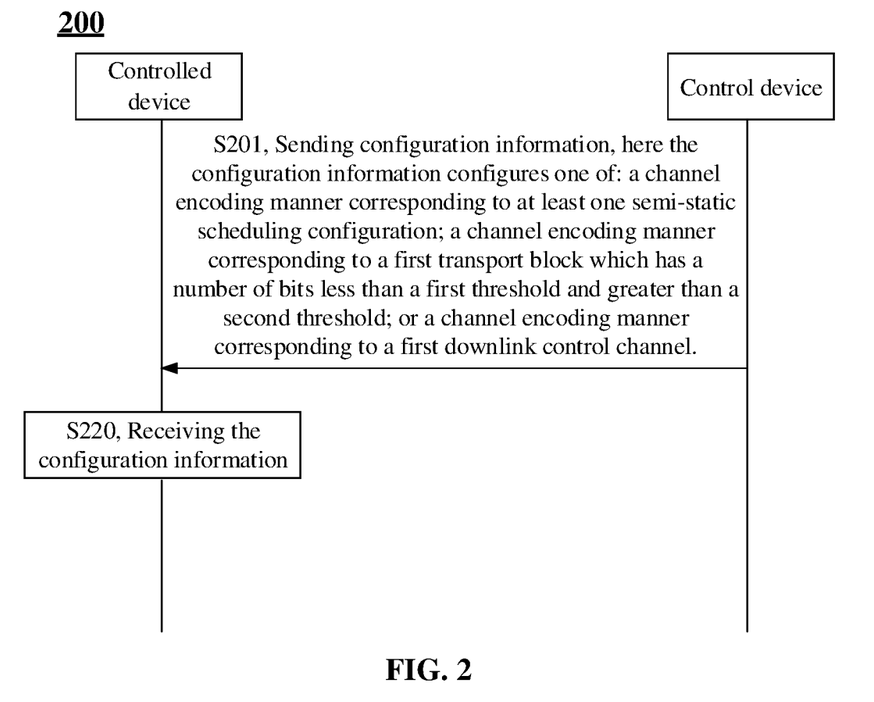
FIG. 2 is a schematic flowchart of a method for channel encoding according to an embodiment of the disclosure.

FIG. 2 is a schematic flowchart of a method 200 for channel encoding according to an embodiment of the disclosure. As shown in FIG. 2, the method 200 for channel encoding may include, but is not limited to, the following contents.

In operation 5210, a control device sends configuration information to a controlled device.

Here, the configuration information is used to configure one of:
  a channel encoding manner corresponding to at least one semi-static scheduling configuration;
  a channel encoding manner corresponding to a first transport block which has a number of bits less than a first threshold and greater than a second threshold; or
  a channel encoding manner corresponding to a first downlink control channel.

In operation 5220, the controlled device receives the configuration information sent by the control device.

The embodiment of the disclosure may be applied to the burst interference system 100 shown in FIG. 1

In the embodiment of the disclosure, uplink refers to a link where the controlled device is used as a sending end and the control device is used as a receiving end; and downlink refers to a link where the controlled device is used as a receiving end and the control device is used as a sending end.

Furthermore, in the embodiment of the disclosure, the controlled device may determine a corresponding channel encoding manner based on the configuration information.

Optionally, in the embodiment of the disclosure, the channel encoding manner includes at least one of:
  polar encoding, LDPC encoding, or Reed-Solomon (RS) encoding.

Optionally, in the embodiment of the disclosure, each of the first threshold and the second threshold is preconfigured or agreed by a protocol, or determined by the control device.

For example, the number of bits of the first transport block is 32.

In the embodiment of the disclosure, the at least one semi-static scheduling configuration may be part or all of semi-static scheduling configuration configured by the control device for the controlled device. The first transport block may be a transport block on an uplink data channel, or may be a transport block on a downlink data channel.

In the embodiment of the disclosure, the semi-static scheduling configuration configures a semi-static scheduling resource, a sending end device may encode a physical channel sent on the semi-static scheduling resource based on a channel encoding manner corresponding to the semi-static scheduling configuration, and a receiving end device may decode a physical channel received on the semi-static scheduling resource based on a channel encoding manner corresponding to the semi-static scheduling configuration.

For example, the control device configures a first semi-static scheduling configuration to correspond to a first encoding manner, and configures a second semi-static scheduling configuration to correspond to a second encoding manner. When a semi-static configuration signaling does not include configuration of encoding manners, it means that a current semi-static scheduling configuration corresponds to an acquiescent encoding manner or a default encoding manner.

Optionally, in the embodiment of the disclosure, the control device determines the configuration information according to first information, or the configuration information is determined according to the first information.

Optionally, in the embodiment of the disclosure, the control device further determines the configuration information according to the first information and first correspondences, or further, the configuration information may be determined according to the first information and the first correspondences.

The first information may include at least one of:
a current time, a geographic position where the control device is located, a geographic position where the controlled device is located, or a channel interference condition.

It is to be noted that the current time may be a time when the control device determines the configuration information.

Optionally, the channel interference condition is obtained by detecting received power on at least one subcarrier.

For example, the control device obtains the channel interference condition by detecting the received power on the at least one subcarrier.

For another example, the controlled device obtains the channel interference condition by detecting the received power on the at least one subcarrier.

Optionally, the at least one subcarrier is selected by the control device according to an implementation of the control device or by the controlled device according to implementation of the controlled device, or may be randomly selected by the control device or the controlled device.

The first correspondences may include at least one of:
correspondences between time information and the channel encoding manners; correspondences between geographic positions where the control device is located and the channel encoding manners; correspondences between the time information and geographic positions where the control device is located, and the channel encoding manners; correspondences between the geographic positions where the controlled device is located and the channel encoding manners; or correspondences between the channel interference conditions and the channel encoding manners.

Optionally, the first correspondences are determined based on preconfigured information. For example, the control device determines the first correspondences according to the preconfiguration information.

Optionally, the control device determines or updates the first correspondences according to the channel interference condition. Alternatively, the first correspondences are determined or updated based on the channel interference condition.

For example, the control device determines, according to the preconfiguration information, that all geographic areas where the control device is located use polar encoding. When the control device detects in a geographic area that received power on a subcarrier or some subcarriers is higher than received power X1 of a subcarrier where an uplink reference signal is located, or when the control device detects in a geographic area that received power on a subcarrier or some subcarriers is higher than Y1, the control device updates an encoding manner corresponding to the geographic area to RS encoding.

Optionally, in the embodiment of the disclosure, the control device sends dynamic signaling to the controlled device in response to the first information being changed, the dynamic signaling instructs the controlled device to change a channel encoding manner configured by the configuration information.

Correspondingly, the controlled device may receive the dynamic signaling sent by the control device in response to the first information being changed, the dynamic signaling instructs the controlled device to change the channel encoding manner configured by the configuration information.

Optionally, the dynamic signaling is further used to schedule downlink transmission or uplink transmission, and the channel encoding manner changed by instruction of the dynamic signaling is valid only for the downlink transmission or uplink transmission scheduled by the dynamic signaling.

Optionally, the channel encoding manner changed by instruction of the dynamic signaling is valid only for a downlink control channel sent in a radio frame.

Optionally, the dynamic signaling is carried in a downlink control channel or a broadcast channel.

It is to be noted that in the embodiment of the disclosure, the uplink data channel is similar to a Physical Uplink Shared Channel (PUSCH) in a cellular network, an uplink control channel is similar to a Physical Uplink Control Channel (PUCCH) in a cellular network, the downlink data channel is similar to a Physical Downlink Shared Channel (PDSCH) in a cellular network, the downlink control channel is similar to a Physical Downlink Control Channel (PDCCH) in a cellular network, and the broadcast channel is similar to a Physical Broadcast Channel (PBCH) in a cellular network.

The channel encoding manner of the disclosure is described in detail below by way of first to third embodiments.

First embodiment: the configuration information configures the channel encoding manner corresponding to at least one semi-static scheduling configuration.

In the first embodiment, the configuration information is semi-static configuration information. For example, the control device configures one or more semi-static scheduling configuration for a controlled node by RRC signaling, and the control device may configure encoding manners used by semi-static scheduling resources configured by the one or more semi-static scheduling configuration.

In the first embodiment, a semi-static scheduling configuration without configuring the channel encoding manner corresponds to an acquiescent encoding manner or a default encoding manner.

Optionally, in the first embodiment:
for a device which performs transmission according to a semi-static scheduling configuration of the at least one semi-static scheduling configuration, a corresponding encoding manner is adopted to encode a to-be-sent physical channel; and/or
for a device which performs reception according to a semi-static scheduling configuration of the at least one semi-static scheduling configuration, a corresponding encoding manner is adopted to decode a received physical channel.

Optionally, the physical channel is an uplink data channel or a downlink data channel.

Optionally, in the first embodiment, the control device may determine, according to a geographic position where it is located currently, an encoding manner which it uses, and adjust the encoding manner along with change of the geographic position. For example, when the position where the control device is located currently is a first geographic area, the control device configures an encoding manner corresponding to a semi-static scheduling configuration as the first encoding manner, and when the control device enters a second geographic area, the control device configures the encoding manner corresponding to the semi-static scheduling configuration as the second encoding manner through RRC signaling.

Optionally, in the first embodiment, the control device may determine, according to a current time thereof, an encoding manner which it uses, and adjust the encoding manner over time. For example, when the current time is a first time period, the control device configures an encoding manner corresponding to a semi-static scheduling configuration as the first encoding manner, and when the first time period is expired, the control device configures the encoding manner corresponding to the semi-static scheduling configuration as the second encoding manner through RRC signaling.

Optionally, in the first embodiment, the control device may determine, according to a current time thereof and a position where it is located currently, an encoding manner which it uses, and adjust the encoding manner over time or change of the position. For example, when the current time is a first time period and the current position is a first geographic area, the control device configures an encoding manner corresponding to a semi-static scheduling configuration as the first encoding manner. Otherwise, the control device configures the encoding manner corresponding to the semi-static scheduling configuration as the second encoding manner through RRC signaling.

Optionally, in the first embodiment, the control device may change the encoding manner used by the semi-static scheduling configuration through dynamic signaling, such as dynamic signaling carried by the downlink control channel. For example, the control device may configure an encoding manner corresponding to a semi-static scheduling configuration as the first encoding manner, and indicate, by the downlink control channel, the encoding manner corresponding to the semi-static scheduling configuration as the second encoding manner when a condition is met. In this case, when a semi-static resource configured by the semi-static scheduling configuration is used for downlink data transmission, the control device uses the second encoding manner to send the downlink data channel, and the controlled device should receive and decode the downlink channel according to the second encoding manner; and when a semi-static resource configured by the semi-static scheduling configuration is used for uplink data transmission, the controlled device should use the second encoding manner to send the uplink data channel, and the control device receives and decodes the uplink channel according to the second encoding manner.

Optionally, in the first embodiment, the encoding manner changed by dynamic signaling is valid only for the downlink transmission or uplink transmission indicated by the dynamic signaling, and in case that there is no indication by the dynamic signaling, the downlink transmission or uplink transmission uses the encoding manner corresponding to the semi-static scheduling configuration.

Optionally, in the first embodiment, the control device may also select, according to a currently measured channel interference condition, an encoding manner which it uses. For example, when the control device detects that received power on a subcarrier or some subcarriers is higher than received power X1 of a subcarrier where an uplink reference signal is located, or when the control device detects that received power on a subcarrier or some subcarriers is higher than Y1, the control device reconfigures an encoding manner corresponding to a semi-static scheduling configuration using the first encoding manner as the second encoding manner, here the first encoding manner may be polar code, and the second encoding manner may be RS code.

Second embodiment: the configuration information configures the channel encoding manner corresponding to the first transport block.

In the second embodiment, the configuration information is semi-static configuration information or dynamic configuration information.

Optionally, in the second embodiment, for a device which sends the first transport block, an encoding manner corresponding to the first transport block is adopted to encode the first transport block; and/or for a device which receives the first transport block, an encoding manner corresponding to the first transport block is adopted to decode the first transport block.

Optionally, in the second embodiment, for dynamically scheduled downlink or uplink transmission, that is, for the first transport block, when the first transport block has a number of bits less than the first threshold and greater than the second threshold, dynamic scheduling signaling carries a specific information field to indicate an encoding manner corresponding to the first transport block. Alternatively, the control device indicates the encoding manner corresponding to the first transport block by semi-static signaling (for example, RRC signaling). Preferably, in the second embodiment, the control device selects or determines the encoding manner corresponding to the first transport block according to a currently measured channel interference condition. For example, when the control device detects that received power on a subcarrier or some subcarriers is higher than received power X2 of a subcarrier where an uplink reference signal is located, or when the control device detects that received power on a subcarrier or some subcarriers is higher than Y2, the control device indicates the encoding manner corresponding to the first transport block as the first encoding manner (for example, RS code) by the dynamic signaling or semi-static signaling. Otherwise, the control device indicates the encoding manner corresponding to the first transport block as the second encoding manner (for example, polar code) by the dynamic signaling or semi-static signaling. The control device may also determine, according to a geographic position where it is located currently, an encoding manner which it uses, and adjust the encoding manner along with change of the geographic position. For example, when the position where the control device is located currently is a first geographic area, the control device indicates an encoding manner corresponding to the first transport block as the first encoding manner, and when the control device enters a second geographic area, the control device indicates the encoding manner corresponding to the first transport block as the second encoding manner. The control device may also determine, according to a current time thereof, an encoding manner which it uses, and adjust the encoding manner over time. The control device may also determine, according to a current time thereof and a position where it is located currently, an encoding manner which it uses, and adjust the encoding manner over time or change of the position.

Optionally, in the second embodiment, the control device indicates the encoding manner corresponding to the first transport block by the semi-static signaling (for example, RRC signaling), and the control device may change the encoding manner corresponding to the first transport block by the dynamic signaling when a condition is met. For example, the control device may configure the encoding manner corresponding to the first transport block as the first encoding manner by the semi-static signaling, and indicate the encoding manner corresponding to the first transport block as the second encoding manner by the downlink control channel when a condition is met. Preferably, the control device selects or determines the encoding manner corresponding to the first transport block according to a currently measured channel interference condition. For example, the control device may configure the encoding manner corresponding to the first transport block as the first encoding manner by the semi-static signaling, and when the control device detects that received power on a subcarrier or some subcarriers is higher than received power $X2$ of a subcarrier where an uplink reference signal is located, or when the control device detects that received power on a subcarrier or some subcarriers is higher than $Y2$, the control device reconfigures the encoding manner corresponding to the first transport block as the second encoding manner, here the first encoding manner may be polar code, and the second encoding manner may be RS code. In this case, the sending end uses the second encoding manner to send the data channel, the controlled device should use the second encoding manner to send the uplink data channel, and the receiving end should receive and decode the uplink channel according to the second encoding manner.

Optionally, in the second embodiment, the encoding manner changed by dynamic signaling is valid only for the downlink transmission or uplink transmission indicated by the dynamic signaling, and in case that there is no indication by the dynamic signaling, the uplink transmission or downlink transmission uses the encoding manner indicated by the semi-static signaling.

Third embodiment: the configuration information configures the channel encoding manner corresponding to the first downlink control channel.

In the third embodiment, the configuration information is semi-static configuration information or dynamic configuration information.

Optionally, in the third embodiment, in case that the configuration information is the semi-static configuration information, the configuration information configures an encoding manner corresponding to the first downlink control channel, for example, to use only polar encoding, RS encoding, or LDPC encoding.

Optionally, in the third embodiment, in case that the configuration information is the dynamic configuration information, the configuration information configures multiple channel encoding manners corresponding to the first downlink control channel.

Optionally, in the third embodiment, a device sending the first downlink control channel uses one of the multiple channel encoding manners to encode the first downlink control channel; and/or a device receiving the first downlink control channel uses the multiple channel encoding manners to detect the first downlink control channel blindly.

Optionally, in the third embodiment, in case that the configuration information configures multiple channel encoding manners corresponding to the first downlink control channel, the control device indicates the multiple channel encoding manners corresponding to the first downlink control channel by a system message, and a sending resource and a sending manner of the broadcast channel are not required to be indicated by the downlink control channel. For example, the control device may indicate the channel encoding manner corresponding to the first downlink control channel as polar code or RS code, or the control device indicates the channel encoding manner corresponding to the first downlink control channel as polar code or RS code through the broadcast message and according to a geographic position where it is located, and the channel encoding manner corresponding to the first downlink control channel is converted into RS code or polar code after the geographic position changes.

Optionally, in the third embodiment, in case that the configuration information configures multiple channel encoding manners corresponding to the first downlink control channel, the receiving end assumes to detect the first downlink control channel blindly according to different channel encoding manners. For example, the first downlink control channel may use polar code and RS code, and the control device indicates the multiple channel encoding manners corresponding to the first downlink control channel by the system message to the controlled device, a sending resource and a sending manner of the broadcast channel are not required to be indicated by the downlink control channel. For example, the control device may indicate the channel encoding manner corresponding to the first downlink control channel as polar code or RS code, and the control device selects the polar code or RS code according to the channel interference condition, to be sent to the first downlink control channel, and the receiving end decodes the first downlink control channel based on two different encoding.

Optionally, in the third embodiment, preferably, the control device sends the first downlink control channel in a radio frame by only one channel encoding manner, or when the control device detects that received power on a subcarrier or some subcarriers is higher than received power $X3$ of a subcarrier where an uplink reference signal is located, or when the control device detects that received power on a subcarrier or some subcarriers is higher than $Y3$, the control device uses RS encoding manner to send the first downlink control channel. Otherwise, the control device uses polar encoding manner to send the first downlink control channel.

Optionally, in the third embodiment, preferably, a controlled node first decodes the downlink control channel based on an encoding manner A, and when at least one downlink control channel is successfully detected, a controlled terminal detects other possible downlink control channels based on the encoding manner A only. Otherwise, the controlled terminal redetects the downlink control channel based on an encoding manner B. The encoding manner A and the encoding manner B may be configured by the system message, or defined by a standard, for example, the standard defines the encoding manner A as polar code, and defines the encoding manner B as RS code.

Therefore, in the embodiment of the disclosure, the control device may configure a channel encoding manner corresponding to at least one semi-static scheduling configuration; or, the control device may configure a channel encoding manner corresponding to a first transport block which has a number of bits less than a first threshold and greater than a second threshold; or, the control device may configure a channel encoding manner corresponding to a first downlink control channel Therefore, channel encoding in a burst interference system may be implemented. That is, for the at least one semi-static scheduling configuration or the first transport block or the first downlink control channel, the control device may configure the channel encoding manner dynamically or semi-statically according to one or more of a current time, a geographic position or a channel interference condition, so that anti-interference capability of a short-range communication system may be improved by adjusting the channel encoding manner.

The method embodiments of the disclosure are described in detail above with reference to FIG. 2, and the apparatus embodiments of the disclosure are described in detail below with reference to FIGS. 3 to 7. It is to be understood that the apparatus embodiments correspond to the method embodiments, and similar descriptions may refer to the method embodiments.

Figure 3:
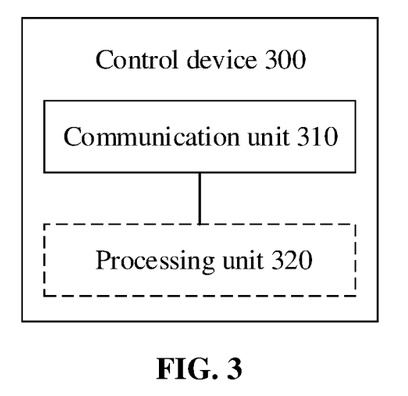
FIG. 3 is a schematic block diagram of a control device according to an embodiment of the disclosure.

FIG. 3 shows a schematic block diagram of a control device 300 according to an embodiment of the disclosure. As shown in FIG. 3, the control device 300 includes a communication unit 310.

The communication unit 310 is configured to send configuration information to a controlled device, here the configuration information is used to configure one of:
  a channel encoding manner corresponding to at least one semi-static scheduling configuration;
  a channel encoding manner corresponding to a first transport block which has a number of bits less than a first threshold and greater than a second threshold; or
  a channel encoding manner corresponding to a first downlink control channel.

Optionally, the control device 300 further includes a processing unit 320.

The processing unit 320 is configured to determine the configuration information according to first information,
  here the first information includes at least one of:
  a current time, a geographic position where the control device is located, a geographic position where the controlled device is located, or a channel interference condition.

Optionally, the channel interference condition is obtained by detecting received power on at least one subcarrier.

Optionally, the at least one subcarrier is selected by the control device according to an implementation of the control device or by the controlled device according to implementation of the controlled device, or randomly selected by the control device or the controlled device.

Optionally, the processing unit 320 is specifically configured to:
  determine the configuration information according to the first information and first correspondences,
  here the first correspondences include at least one of:
  correspondences between time information and the channel encoding manners; correspondences between geographic positions where the control device is located and the channel encoding manners; correspondences between the time information and geographic positions where the control device is located, and the channel encoding manners; correspondences between the geographic positions where the controlled device is located and the channel encoding manners; or correspondences between the channel interference conditions and the channel encoding manners.

Optionally, the first correspondences are determined based on preconfigured information.

Optionally, the processing unit 320 is further configured to determine or update the first correspondences according to the channel interference condition.

Optionally, the communication unit 310 is further configured to send dynamic signaling to the controlled device in response to the first information being changed, the dynamic signaling instructs the controlled device to change a channel encoding manner configured by the configuration information.

Optionally, the dynamic signaling is further used to schedule downlink transmission or uplink transmission, and the channel encoding manner changed by instruction of the dynamic signaling is valid only for the downlink transmission or uplink transmission scheduled by the dynamic signaling.

Optionally, the channel encoding manner changed by instruction of the dynamic signaling is valid only for a downlink control channel sent in a radio frame.

Optionally, the dynamic signaling is carried in a downlink control channel or a broadcast channel.

Optionally, each of the first threshold and the second threshold is preconfigured or agreed by a protocol, or determined by the control device.

Optionally, the configuration information is semi-static configuration information, in response to the configuration information configuring the channel encoding manner corresponding to the at least one semi-static scheduling configuration.

Optionally, a semi-static scheduling configuration without configuring the channel encoding manner corresponds to an acquiescent encoding manner or a default encoding manner.

Optionally, for a device which performs transmission according to a semi-static scheduling configuration of the at least one semi-static scheduling configuration, a corresponding encoding manner is adopted to encode a to-be-sent physical channel; and/or
  for a device which performs reception according to a semi-static scheduling configuration of the at least one semi-static scheduling configuration, a corresponding encoding manner is adopted to decode a received physical channel.

Optionally, the physical channel is an uplink data channel or a downlink data channel.

Optionally, the configuration information is semi-static configuration information or dynamic configuration information, in response to the configuration information configuring the channel encoding manner corresponding to the first transport block.

Optionally, for a device which sends the first transport block, an encoding manner corresponding to the first transport block is adopted to encode the first transport block; and/or for a device which receives the first transport block, an encoding manner corresponding to the first transport block is adopted to decode the first transport block.

Optionally, the configuration information is semi-static configuration information or dynamic configuration information, in response to the configuration information configuring the channel encoding manner corresponding to the first downlink control channel.

Optionally, the configuration information configures multiple channel encoding manners corresponding to the first downlink control channel, in response to the configuration information being the dynamic configuration information.

Optionally, a device sending the first downlink control channel uses one of the multiple channel encoding manners to encode the first downlink control channel; and/or a device receiving the first downlink control channel uses the multiple channel encoding manners to detect the first downlink control channel blindly.

Optionally, the channel encoding manner includes at least one of:
polar encoding, LDPC encoding, or RS encoding.

Optionally, in some embodiments, the communication unit may be a communication interface or a transceiver, or an input/output (I/O) interface of a communication chip or a system-on-chip. The processing unit may be one or more processors.

It is to be understood that the control device 300 according to the embodiment of the disclosure may correspond to the control device in the method embodiments of the disclosure, and the above and other operations and/or functions of each unit in the control device 300 respectively implement corresponding flows of the control device in the method 200 shown in FIG. 2, and details thereof are not elaborated here for brevity.

Figure 4:
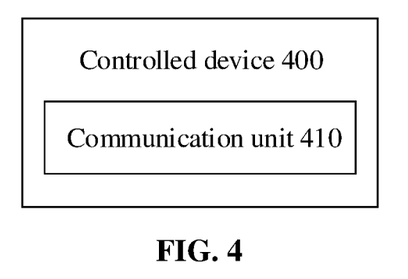
FIG. 4 is a schematic block diagram of a controlled device according to an embodiment of the disclosure.

FIG. 4 shows a schematic block diagram of a controlled device 400 according to an embodiment of the disclosure. As shown in FIG. 4, the controlled device 400 includes a communication unit 410.

The communication unit 410 is configured to receive configuration information sent by a control device, here the configuration information is used to configure one of:
a channel encoding manner corresponding to at least one semi-static scheduling configuration;
a channel encoding manner corresponding to a first transport block which has a number of bits less than a first threshold and greater than a second threshold; or
a channel encoding manner corresponding to a first downlink control channel.

Optionally, the configuration information is determined according to first information.

Here, the first information includes at least one of:
a current time, a geographic position where the control device is located, a geographic position where the controlled device is located, or a channel interference condition.

Optionally, the channel interference condition is obtained by detecting received power on at least one subcarrier.

Optionally, the at least one subcarrier is selected by the control device according to an implementation of the control device or by the controlled device according to implementation of the controlled device, or randomly selected by the control device or the controlled device.

Optionally, the configuration information is determined according to the first information and first correspondences. Here, the first correspondences include at least one of:
correspondences between time information and the channel encoding manners; correspondences between geographic positions where the control device is located and the channel encoding manners; correspondences between the time information and geographic positions where the control device is located, and the channel encoding manners; correspondences between the geographic positions where the controlled device is located and the channel encoding manners; or correspondences between the channel interference conditions and the channel encoding manners.

Optionally, the first correspondences are determined based on preconfigured information.

Optionally, the first correspondences are determined or updated based on the channel interference condition.

Optionally, the communication unit 410 is further configured to receive dynamic signaling sent by the control device in response to the first information being changed, the dynamic signaling instructs the controlled device to change a channel encoding manner configured by the configuration information.

Optionally, the dynamic signaling is further used to schedule downlink transmission or uplink transmission, and the channel encoding manner changed by instruction of the dynamic signaling is valid only for the downlink transmission or uplink transmission scheduled by the dynamic signaling.

Optionally, the channel encoding manner changed by instruction of the dynamic signaling is valid only for a downlink control channel sent in a radio frame.

Optionally, the dynamic signaling is carried in a downlink control channel or a broadcast channel.

Optionally, each of the first threshold and the second threshold is preconfigured or agreed by a protocol, or determined by the control device.

Optionally, the configuration information is semi-static configuration information, in response to the configuration information configuring the channel encoding manner corresponding to the at least one semi-static scheduling configuration.

Optionally, a semi-static scheduling configuration without configuring the channel encoding manner corresponds to an acquiescent encoding manner or a default encoding manner.

Optionally, for a device which performs transmission according to a semi-static scheduling configuration of the at least one semi-static scheduling configuration, a corresponding encoding manner is adopted to encode a to-be-sent physical channel; and/or
for a device which performs reception according to a semi-static scheduling configuration of the at least one semi-static scheduling configuration, a corresponding encoding manner is adopted to decode a received physical channel.

Optionally, the physical channel is an uplink data channel or a downlink data channel.

Optionally, the configuration information is semi-static configuration information or dynamic configuration information, in response to the configuration information configuring the channel encoding manner corresponding to the first transport block.

Optionally, for a device which sends the first transport block, an encoding manner corresponding to the first transport block is adopted to encode the first transport block; and/or for a device which receives the first transport block, an encoding manner corresponding to the first transport block is adopted to decode the first transport block.

Optionally, the configuration information is semi-static configuration information or dynamic configuration information, in response to the configuration information configuring the channel encoding manner corresponding to the first downlink control channel.

Optionally, the configuration information configures multiple channel encoding manners corresponding to the first downlink control channel, in response to the configuration information being the dynamic configuration information.

Optionally, a device sending the first downlink control channel uses one of the multiple channel encoding manners to encode the first downlink control channel; and/or a device receiving the first downlink control channel uses the multiple channel encoding manners to detect the first downlink control channel blindly.

Optionally, the channel encoding manner includes at least one of:

polar encoding, LDPC encoding, or RS encoding.

Optionally, in some embodiments, the communication unit may be a communication interface or a transceiver, or an I/O interface of a communication chip or a system-on-chip. The processing unit may be one or more processors.

It is to be understood that the controlled device 400 according to the embodiment of the disclosure may correspond to the controlled device in the method embodiments of the disclosure, and the above and other operations and/or functions of each unit in the controlled device 400 respectively implement corresponding flows of the controlled device in the method 200 shown in FIG. 2, and details thereof are not elaborated here for brevity.

Figure 5:
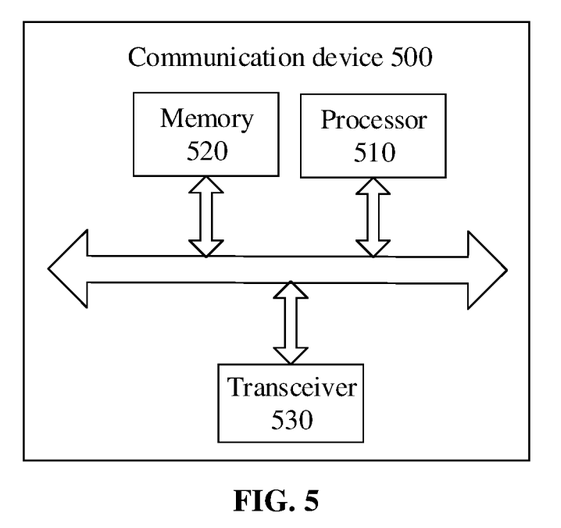
FIG. 5 is a schematic block diagram of a communication device according to an embodiment of the disclosure.

FIG. 5 is a schematic structural diagram of a communication device 500 according to an embodiment of the disclosure. The communication device 500 shown in FIG. 5 includes a processor 510 which may call and run a computer program in a memory to implement the methods of the embodiments of the disclosure.

Optionally, as shown in FIG. 5, the communication device 500 may further include a memory 520. The processor 510 may call and run a computer program in the memory 520 to implement the methods of the embodiments of the disclosure.

The memory 520 may be a separate device independent of the processor 510, or may be integrated in the processor 510.

Optionally, as shown in FIG. 5, the communication device 500 may further include a transceiver 530. The processor 510 may control the transceiver 530 to communicate with other devices, specifically, to send information or data to other devices, or receive information or data sent by other devices.

The transceiver 530 may include a transmitter and a receiver. The transceiver 530 may further include antennas, and a number of antennas may be one or more.

Optionally, the communication device 500 may specifically be the control device in the embodiments of the disclosure, and the communication device 500 may implement corresponding flows, implemented by the control device, in each method of the embodiments of the disclosure, and details thereof are not elaborated here for brevity.

Optionally, the communication device 500 may specifically be the controlled device in the embodiments of the disclosure, and the communication device 500 may implement corresponding flows, implemented by the controlled device, in each method of the embodiments of the disclosure, and details thereof are not elaborated here for brevity.

Figure 6:
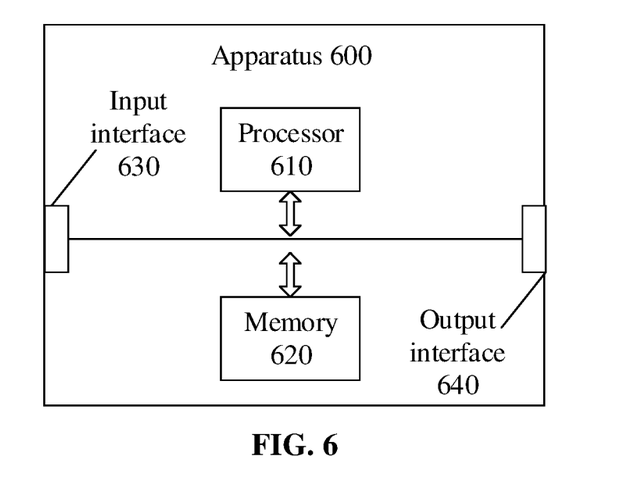
FIG. 6 is a schematic block diagram of an apparatus according to an embodiment of the disclosure.

FIG. 6 is a schematic structural diagram of an apparatus according to an embodiment of the disclosure. The apparatus 600 shown in FIG. 6 includes a processor 610 which may call and run a computer program in a memory to implement the methods of the embodiments of the disclosure.

Optionally, as shown in FIG. 6, the apparatus 600 may further include a memory 620. The processor 610 may call and run a computer program in the memory 620 to implement the methods of the embodiments of the disclosure.

The memory 620 may be a separate device independent of the processor 610, or may be integrated in the processor 610.

Optionally, the apparatus 600 may further include an input interface 630. The processor 610 may control the input interface 630 to communicate with other devices or chips, specifically, to obtain information or data sent by other devices or chips.

Optionally, the apparatus 600 may further include an output interface 640. The processor 610 may control the output interface 640 to communicate with other devices or chips, specifically, to output information or data to other devices or chips.

Optionally, the apparatus may be applied to the control device in the embodiments of the disclosure, and the apparatus may implement corresponding flows, implemented by the control device, in each method of the embodiments of the disclosure, and details thereof are not elaborated here for brevity.

Optionally, the apparatus may be applied to the controlled device in the embodiments of the disclosure, and the apparatus may implement corresponding flows, implemented by the controlled device, in each method of the embodiments of the disclosure, and details thereof are not elaborated here for brevity.

Optionally, the apparatus mentioned in the embodiment of the disclosure may also be a chip. For example, it may be a system-level chip, a system chip, a chip system, an on-chip system chip, or the like.

Figure 7:
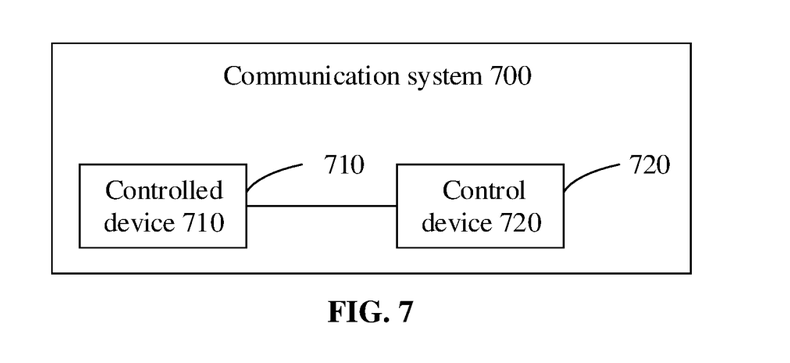
FIG. 7 is a schematic block diagram of a communication system according to an embodiment of the disclosure.

FIG. 7 is a schematic block diagram of a communication system 700 according to an embodiment of the disclosure. As shown in FIG. 7, the communication system 700 includes a controlled device 710 and a control device 720.

The controlled device 710 may be configured to implement corresponding functions, implemented by the controlled device, in the above methods, and the control device 720 may be configured to implement corresponding functions, implemented by the control device, in the above method, and details thereof are not elaborated here for brevity.

It is to be understood that the processor in the embodiments of the disclosure may be an integrated circuit chip and has a signal processing capability. In an implementation process, each step in the above method embodiments may be completed by an integrated logical circuit in a hardware form in the processor or an instruction in a software form. The processor may be a general-purpose processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, step and logical block diagram disclosed in the embodiments of the disclosure may be implemented or executed. The general-purpose processor may be a microprocessor or the processor may also be any conventional processor or the like. Steps in the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM), a register, or the like. The storage medium is located in a memory, and the processor reads information in the memory, and completes steps in the above methods in combination with hardware thereof.

It may be understood that the memory in the embodiments of the disclosure may be a volatile memory or a non-volatile memory, or may include both the volatile and non-volatile memories. The non-volatile memory may be a ROM, a PROM, an Erasable PROM (EPROM), an EEPROM or a flash memory. The volatile memory may be an RAM, and is used as an external high-speed cache. By way of exemplary rather than limiting explanation, RAMs in various forms may be used, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory in the systems and methods described in the disclosure is intended to include, but is not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM, a DR RAM, or the like. That is, the memory in the embodiments of the disclosure is intended to include, but is not limited to, memories of these and any other proper types.

The embodiments of the disclosure also provide a computer-readable storage medium configured to store a computer program.

Optionally, the computer-readable storage medium may be applied to the control device in the embodiments of the disclosure, and the computer program enables a computer to execute corresponding flows, implemented by the control device, in each method of the embodiments of the disclosure, and details thereof are not elaborated here for brevity.

Optionally, the computer-readable storage medium may be applied to the controlled device in the embodiments of the disclosure, and the computer program enables a computer to execute corresponding flows, implemented by the controlled device, in each method of the embodiments of the disclosure, and details thereof are not elaborated here for brevity.

The embodiments of the disclosure also provide a computer program product including a computer program instruction.

Optionally, the computer program product may be applied to the control device in the embodiments of the disclosure, and the computer program instruction enables a computer to execute corresponding flows, implemented by the control device, in each method of the embodiments of the disclosure, and details thereof are not elaborated here for brevity.

Optionally, the computer program product may be applied to the controlled device in the embodiments of the disclosure, and the computer program instruction enables the computer to execute corresponding flows, implemented by the controlled device, in each method of the embodiments of the disclosure, and details thereof are not elaborated here for brevity.

The embodiments of the disclosure also provide a computer program.

Optionally, the computer program may be applied to the control device in the embodiments of the disclosure, and when the computer program is executed on a computer, the computer program enables the computer to execute corresponding flows, implemented by the control device, in each method of the embodiments of the disclosure, and details thereof are not elaborated here for brevity.

Optionally, the computer program may be applied to the controlled device in the embodiments of the disclosure, and when the computer program is executed on a computer, the computer program enables the computer to execute corresponding flows, implemented by the controlled device, in each method of the embodiments of the disclosure, and details thereof are not elaborated here for brevity.

With the above technical solutions, the control device may configure a channel encoding manner corresponding to at least one semi-static scheduling configuration; or, the control device may configure a channel encoding manner corresponding to a first transport block which has a number of bits less than a first threshold and greater than a second threshold; or, the control device may configure a channel encoding manner corresponding to a first downlink control channel Therefore, channel encoding in a burst interference system may be implemented.

It may be appreciated by those of ordinary skill in the art that units and algorithm steps of each example described in combination with the embodiments disclosed in the disclosure may be implemented by electronic hardware or a combination of computer software and the electronic hardware. Whether these functions are executed in a hardware or software manner, depends on specific applications and design constraints of the technical solutions. Professionals may implement the described functions for each specific application with different methods, but such implementation shall not be considered as going beyond the scope of the disclosure.

It may be understood clearly by those skilled in the art that regarding specific operation flows of the system, apparatus and unit as described above, reference may made to corresponding flows in the above method embodiments, and details thereof are not elaborated here, for convenient and brief description.

In some embodiments provided by the disclosure, it is to be understood that the disclosed system, apparatus and method may be implemented in other manners. For example, the apparatus embodiment as described above is only schematic, and for example, division of the units is only logic function division, and other division manners may be used during practical implementation. For example, multiple units or components may be combined or integrated into another system, or some characteristics may be neglected or may not be executed. Furthermore, coupling or direct coupling or communication connection between displayed or discussed components may be indirect coupling or communication connection implemented through some interfaces, apparatuses or units, and may be electrical, mechanical or in other forms.

Units described as separate parts may or may not be physically separated, and parts displayed as units may or may not be physical units, namely, may be located in the same place, or may also be distributed to multiple network units. Part or all of the units may be selected to achieve the purpose of the solutions in the embodiments according to a practical requirement.

Furthermore, functional units in each embodiment of the disclosure may be integrated into a processing unit, each unit may also physically exist independently, or two or more than two units may also be integrated into a unit.

When being implemented in form of software functional unit and sold or used as an independent product, the function may be stored in a computer-readable storage medium. Based on such understanding, the essential part of the technical solutions of the disclosure or a part of the technical solutions that contributes to the related art or a part of the technical solutions may be implemented in form of a software product. The computer software product is stored in a storage medium and includes several instructions to enable a computer device (which may be a personal computer, a server, a control device, or the like.) to execute all or a part of steps of the methods described in the embodiments of the disclosure. The forgoing storage media includes various mediums that may store program codes, such as a USB disk, a mobile hard disk, a ROM, a RAM, a magnetic disk, an optical disk, or the like.

The foregoing are only specific embodiments of the disclosure, but the protection scope of the disclosure is not limited thereto. Variation and substitution which may be readily thought by those skilled in the art within the technical scope disclosed in the disclosure should fall within the protection scope of the disclosure. Therefore, the protection scope of the disclosure should conform to the protection scope of the claims.

What is claimed is:

1. A method for channel encoding, comprising:
   sending, by a control device, configuration information to a controlled device, wherein the configuration information is used to configure
   a channel encoding manner corresponding to at least one semi-static scheduling configuration;
   wherein the channel encoding manner comprises at least one of:
   polar encoding, low density parity-check code (LDPC) encoding, or Reed-Solomon (RS) encoding.

2. The method of claim 1, further comprising:
   determining, by the control device, the configuration information according to first information,
   wherein the first information comprises at least one of:
   a current time, a geographic position where the control device is located, a geographic position where the controlled device is located, or a channel interference condition.

3. The method of claim 2, wherein the channel interference condition is obtained by detecting received power on at least one subcarrier.

4. The method of claim 3, wherein the at least one subcarrier is selected by the control device according to an implementation of the control device or by the controlled device according to implementation of the controlled device, or the at least one subcarrier is randomly selected by the control device or the controlled device.

5. The method of claim 2, wherein determining, by the control device, the configuration information according to the first information comprises:
   determining, by the control device, the configuration information according to the first information and first correspondences,
   wherein the first correspondences comprise at least one of:
   correspondences between time information and the channel encoding manners; correspondences between geographic positions where the control device is located and the channel encoding manners; correspondences between the time information and geographic positions where the control device is located, and the channel encoding manners; correspondences between the geographic positions where the controlled device is located and the channel encoding manners; or correspondences between the channel interference conditions and the channel encoding manners.

6. The method of claim 5, wherein the first correspondences are determined based on preconfigured information.

7. The method of claim 1, wherein the configuration information is semi-static configuration information.

8. The method of claim 7, wherein
   for a device which performs transmission according to a semi-static scheduling configuration of the at least one semi-static scheduling configuration, a corresponding encoding manner is adopted to encode a to-be-sent physical channel; or
   for a device which performs reception according to a semi-static scheduling configuration of the at least one semi-static scheduling configuration, a corresponding encoding manner is adopted to decode a received physical channel.

9. The method of claim 8, wherein the physical channel is an uplink data channel or a downlink data channel.

10. A method for channel encoding, comprising:
    receiving, by a controlled device, configuration information sent by a control device, wherein the configuration information is used to configure
    a channel encoding manner corresponding to at least one semi-static scheduling configuration;
    wherein the channel encoding manner comprises at least one of:
    polar encoding, low density parity-check code (LDPC) encoding, or Reed-Solomon (RS) encoding.

11. The method of claim 10, wherein the configuration information is semi-static configuration information.

12. The method of claim 11, wherein
    for a device which performs transmission according to a semi-static scheduling configuration of the at least one semi-static scheduling configuration, a corresponding encoding manner is adopted to encode a to-be-sent physical channel; or
    for a device which performs reception according to a semi-static scheduling configuration of the at least one semi-static scheduling configuration, a corresponding encoding manner is adopted to decode a received physical channel.

13. The method of claim 12, wherein the physical channel is an uplink data channel or a downlink data channel.

14. A control device, comprising:
    a transceiver configured to send configuration information to a controlled device, wherein the configuration information is used to configure
    a channel encoding manner corresponding to at least one semi-static scheduling configuration;
    wherein the channel encoding manner comprises at least one of:
    polar encoding, low density parity-check code (LDPC) encoding, or Reed-Solomon (RS) encoding.

15. The control device of claim 14, wherein the configuration information is semi-static configuration information.

16. The control device of claim 15, wherein
    for a device which performs transmission according to a semi-static scheduling configuration of the at least one semi-static scheduling configuration, a corresponding encoding manner is adopted to encode a to-be-sent physical channel; or
    for a device which performs reception according to a semi-static scheduling configuration of the at least one semi-static scheduling configuration, a corresponding encoding manner is adopted to decode a received physical channel.

17. The control device of claim 16, wherein the physical channel is an uplink data channel or a downlink data channel.

* * * * *